United States Patent [19]

Fisher, Jr.

[11] 4,389,975

[45] Jun. 28, 1983

[54] DUAL PURPOSE BIRD FEEDER

[76] Inventor: James B. Fisher, Jr., 2 Graybridge La., St. Louis, Mo. 63124

[21] Appl. No.: 218,621

[22] Filed: Dec. 22, 1980

Related U.S. Application Data

[63] Continuation-in-part of Ser. No. 110,459, Jan. 8, 1980, abandoned.

[51] Int. Cl.³ .............................................. A01K 39/01
[52] U.S. Cl. ................................ 119/51 R; 119/52 R
[58] Field of Search ............................ 119/51 R, 52 R

[56] References Cited

U.S. PATENT DOCUMENTS

| | | | |
|---|---|---|---|
| 2,524,502 | 10/1950 | Wilkinson | 119/51 R |
| 2,891,508 | 6/1959 | Bower | 119/51 R |
| 3,316,884 | 5/1967 | Viggars | 119/52 R |
| 3,742,914 | 7/1973 | Spencer et al. | 119/52 R |
| 3,977,363 | 8/1976 | Fisher, Jr. | 119/52 R |
| 4,259,927 | 4/1981 | Clarke | 119/51 R |

Primary Examiner—Hugh R. Chamblee
Attorney, Agent, or Firm—Glenn K. Robbins

[57] ABSTRACT

A dual purpose bird feeder for use mounted upon a post with a squirrel baffle preventing climbing upon the feeder or for use in a free hanging relation where it is supported on a chain. The bird feeder is comprised of a frusto-conical hollow feeder housing with a tray at the bottom and flat shallow roof at the top. In the freely supported relation the feeder tray has a radius not exceeding about 55% of the radius of the roof and the outer periphery is positioned underneath the upper portion of the housing. The depth of the tray beneath the roof also does not exceed about one-half of the radius of the roof. This relationship prevents or discourages squirrels or large undesirable birds from using the feeder tray. In the post supported version the squirrel barrier baffle is of the same frusto-conical construction as the feeder housing for ease in manufacture and is positioned underneath the tray. A cylindrical baffle may depend from the tray to which the frusto-conical baffle may be removably attached. Means are provided for a central post to connect to the feeder. The inverted upwardly flaring baffle and its spacing of the bottom wall from the central support post effectively prevents squirrels from climbing the post on the feeder tray.

11 Claims, 12 Drawing Figures

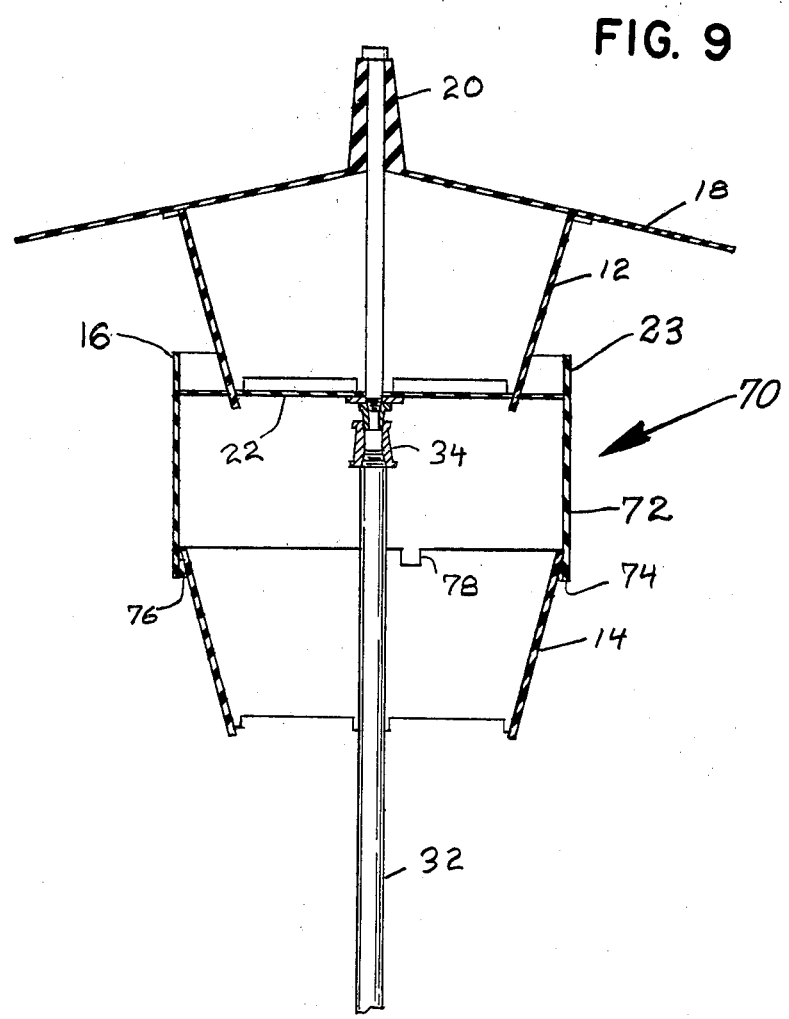

DUAL PURPOSE BIRD FEEDER

RELATED APPLICATION

This application is a continuation-in-part of applicant's parent application Ser. No. 110,459, filed Jan. 8, 1980, now abandoned.

SUMMARY OF THE INVENTION

In the past bird feeders of one type or another have been constructed both in post supported and free hanging form. It has been a particular problem in such bird feeders to prevent their use by squirrels, undesirable large birds and other predators. One such bird feeder adapted for being supported from a chain to prevent squirrels from using the device is shown in my prior U.S. Pat. No. 3,977,363 and which is shown for free hanging support.

In the instant invention there has been provided a dual purpose bird feeder which has an identical housing for the feed in both a free hanging and post supported versions. Further, in the post supported version the same housing element can be employed beneath a feeder tray to provide in a shroud-like or sleeve-like fashion surrounding a central support post to prevent squirrels from reaching upwardly and climbing onto the feeder tray. The feeder is very simply adapted for dual purpose use either as a post supported feeder having the squirrel barrier baffle or by elimination of this baffle to be used from a support chain which may be conveniently connected on a limb or other support from which the feeder may depend.

In the free hanging embodiment the feeder housing is used in the form of an inverted upwardly flaring hollow feeder housing positioned upon a bottom feeder tray. A conical roof of shallow slope is supported by gravity on the top of the housing and has an elongated ferrule at the top of the housing and has an elongated ferrule at the top which receives a chain passing therethrough and connected to a support rod extending between the top side walls of the housing.

In order to prevent squirrels from climbing down the chain and out on the roof and reaching into the housing and also to prevent large birds from using the feeder at the expense of small songbirds, a particular relationship of the dimension of the overhang of the roof and positioning of the feeder tray underneath the roof is employed. Thus a feeder tray is used with a radius not exceeding about 55% the radius of the roof. The feeder tray is positioned with its outer periphery directly underneath the upper edge of the housing and is positioned below the roof a depth not exceeding about one-half of the radius of the roof. In this fashion the outer edge of the feeder tray is positioned underneath the upwardly flaring housing and presents a restricted access which can only be reached by songbirds and not by large birds such as pigeons or the like. Further, a squirrel that may be climbing down the chain upon the roof when reaching over the roof tends to tilt the feeder away from the vertical such that he cannot then be in a position to reach into the feeder tray and may be pitched upon the ground.

In the post supported embodiment a central support post is connected to a union fitting underneath the feeder tray. An extension rod is threaded into the top of the union and extends through the feeder and into the ferrule of the roof. A cap-nut as a stop is threadedly connected to the top of the extension rod to prevent the roof from being moved upwardly until the cap-nut is removed to permit the roof to be lifted for filling the housing with feed. A squirrel baffle of the same construction and dimensioning as the feeder housing is employed beneath the feeder. This construction greatly simplifies the manufacture and production of the feeder. Further, the squirrel baffle through its upwardly and outwardly flaring hard plastic construction of which the feeder is constructed make it difficult for a squirrel climbing the post to reach outwardly and climb the post onto the feeder. In the post supported embodiment the relationship of the radius of the roof and the feeder tray and the depth of the tray beneath the roof is observed in the same fashion as described for the free hanging embodiment to inhibit the use of the feeder by large birds or the like. Further, the feeder in the post supported fashion may freely rotate on the post such that when squirrels may jump upon the feeder from the adjacent trees or the like or large birds may alight upon the feeder the "merry-go-round" action created by the force of the predators discourages the use of the feeder by the predator.

In a modification the tray may have a downwardly depending hollow cylindrical spacer portion to which the frusto-conical squirrel baffle may be removably attached. This cylindrical portion spaces the bottom wall of the frusto-conical baffle even further from the feeder tray to prevent or discourage even the most athletic of squirrels from climbing onto the tray.

The dual purpose feeder of the invention is simply installed either in the post supported or the free hanging embodiments. The feeder, in either of the versions effectively prevents use by squirrels or large birds or other predators and substantially increases the efficiency in attracting and feeding songbirds and the like.

The above features are objects of this invention and further objects will appear in the detailed description which follows and will otherwise be apparent to those skilled in the art.

For the purpose of illustration of this invention there is shown in the accompanying drawings a preferred embodiment thereof. It is to be understood that these drawings are for the purpose of illustration only and that the invention is not limited thereto.

IN THE DRAWINGS

FIG. 9, is a view in vertical section similar to FIG. 4, showing a modification of the post mounted bird feeder using a spacer baffle.

DESCRIPTION OF THE INVENTION

Figure 1:
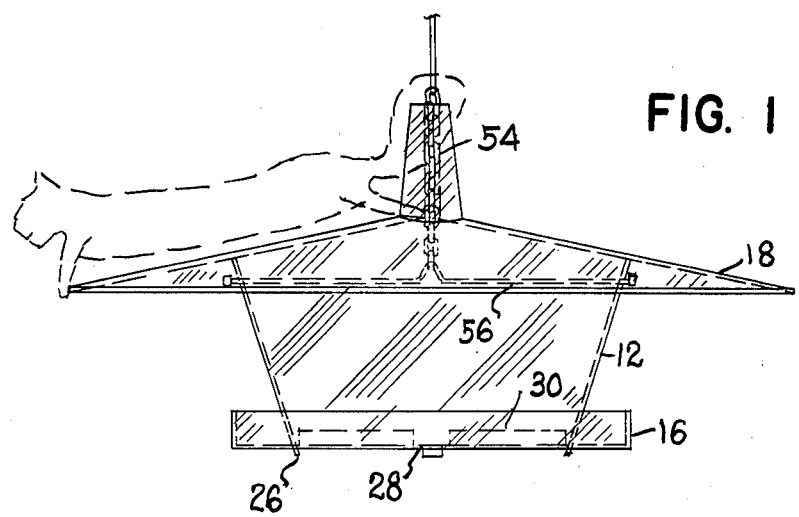
FIG. 1, is a view in side elevation of the chain supported bird feeder.
Figure 2:
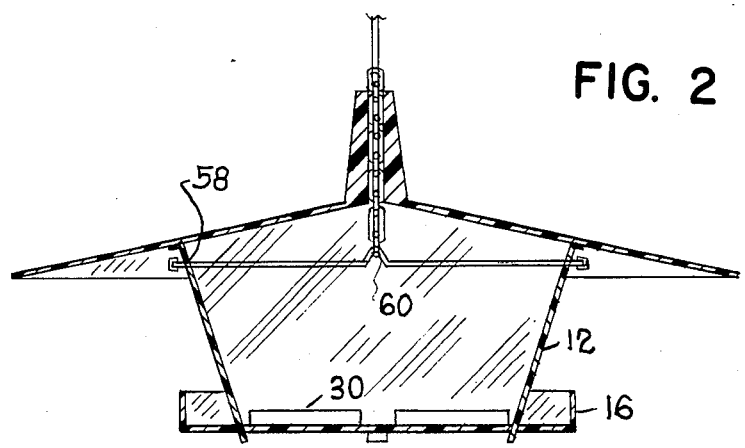
FIG. 2, is a view in vertical section taken through the axis of the feeder of FIG. 1.
Figure 3:
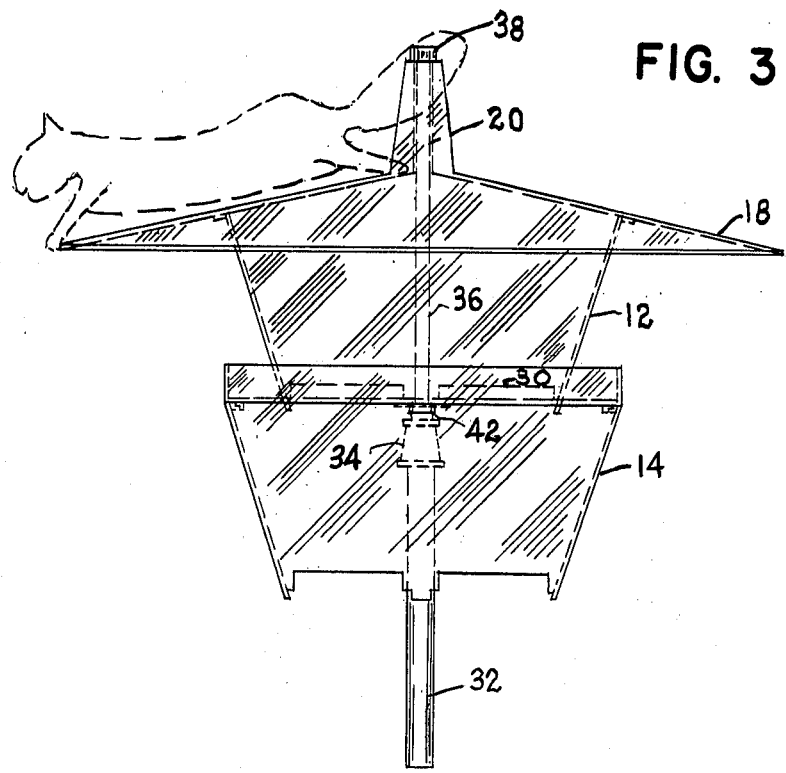
FIG. 3, is a view in side elevation showing the post supported bird feeder with the squirrel baffle connected.
Figure 4:
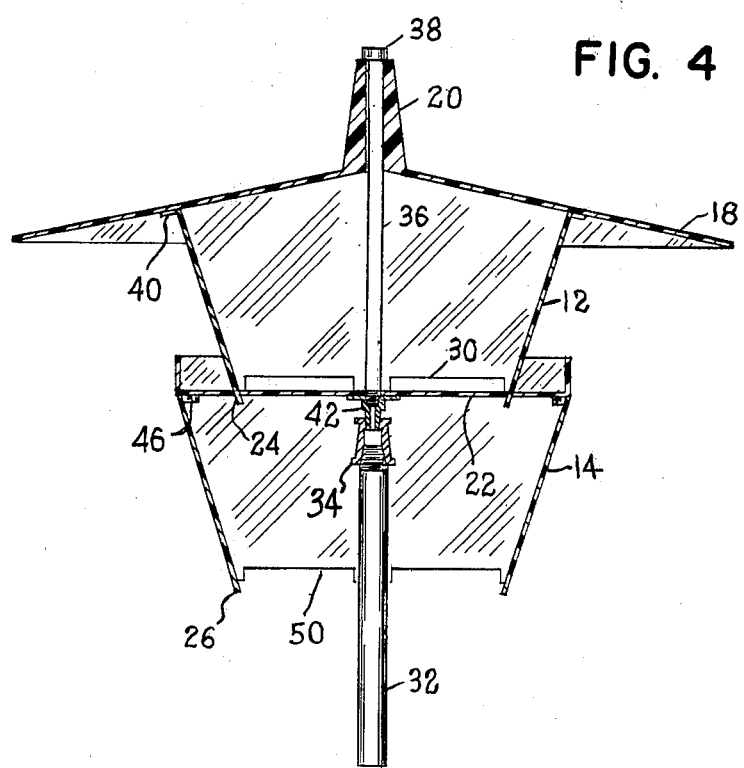
FIG. 4, is a view in section of the bird feeder of FIG. 3, taken on the vertical axis thereof.
Figure 5:
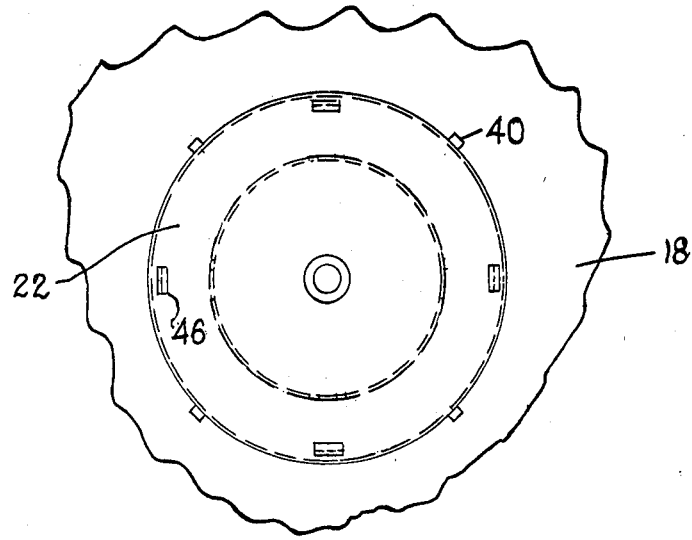
FIG. 5, is a fragmentary bottom plan view of the top portion of the bird feeder without the squirrel baffle.
Figure 6:
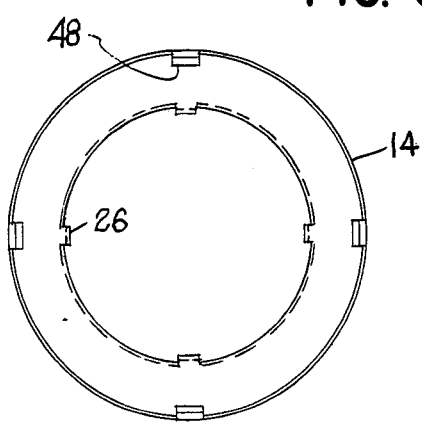
FIG. 6, is a top plan view of the squirrel baffle.

The dual purpose bird feeder of this invention is generally indicated by the reference numeral 10 in FIGS. 3 and 4 where it is shown in the post supported form. It is comprised of an upper bird feeder housing 12 and a lower squirrel barrier baffle 14. In FIGS. 1 and 2 the bird feeder is shown in free hanging form and the baffle and post support connections have been eliminated. The dual purpose aspect of the bird feeder is thus shown in the post supported squirrel barrier baffle embodiment in FIGS. 3 and 4 in the free hanging embodiment of FIGS. 1 and 2.

Referring more particularly to the post support embodiment of FIGS. 3 and 4 the bird feeder housing 12 is comprised of a frusto-conical inverted plastic member which is connected to a feeder tray 16 at the bottom. A roof 18 is supported to the top of the bird feeder housing and has a relatively shallow slope overhanging the bird feeder housing a substantial extent to prevent squirrels from leaning over the edge and obtaining feed from the tray. The roof 18 is further provided with a conical ferrule 20 which has a top opening for reception either of a post or a chain. The ferrule also serves as a handle in order that the roof may be lifted and the feeder housing 12 be filled with feed.

The feed tray 16 has a floor or base 22 and a rim 23. The floor 22 has a plurality of slot-like openings 24 which receive tabs 26 extending from the bottom of the feeder housing 12. The tabs 26 are provided with shoulders 28 which serve as a stop or rest to support the feeder housing above the feed openings 30 defined between adjacent tabs. These openings provide a source for feed to flow from the feeder housing upon the outer periphery of the feeder tray.

The relative radius of the roof 18, the radius of the feeder tray 16 and the distance between the feeder tray and bottom of the roof is important. This dimensioning not only serves as to prevent squirrels from reaching over the edge of the roof 18 into the feeder tray but also provides a restricted access to prevent large birds such as pigeons and the like from perching upon the feeder tray and rob the food from the more desirable smaller size songbirds. It will be also noted that the upper edge of the upwardly flaring feeder housing 12 is approximately of the same radius as the feeder tray from an inspection of FIG. 4 which further aids in providing a restriction to the feeder tray by undesirable predators. The dimensioning as afore noted is such that the radius of the feeder tray does not exceed about 55% of the radius of the roof. The depth of the floor of the tray likewise is important and does not exceed about one-half the radius of the roof. This relationship will appear in FIG. 4 where it will be evident that this proportioning has not been exceeded.

As an actual example the radius of the roof may be 10 inches while the radius of the feeder tray and the upper part of the housing may be 5½ inches. The depth of the feeder tray in the example is 4½ inches from the floor of the feeder tray to the bottom of the roof.

The support of the housing and tray to a post 32 is best shown in FIGS. 3 and 4. As there shown, the post 32 has an upper threaded end which is received in a union 34. Within the union 34 is a lower threaded end of an extension support rod or post 36 which is threaded at its upper end and receives a cap-nut 38. The cap-nut serves as a stop to prevent the roof from being moved upwardly. The roof, it is noted, has support positioning tabs 40 which nest at the exterior of the upper portion of the feeder housing 12.

A bearing 42 positioned between the union 34 and the bottom wall 22 of the feeder tray permits the feeder housing to rotate thereupon. Through such rotation or merry-go-around effect any squirrel or large birds climbing or perching on the top of the roof 10 will have an unstable support and the rotation created by their movement discourages their use of the feeder.

Figure 8:
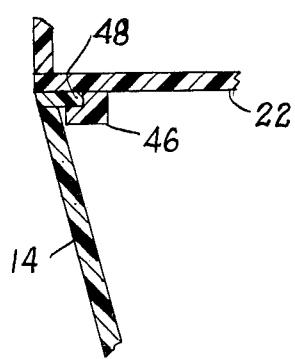
FIG. 8, is a view in section taken on the line 8—8 of FIG. 7.
Figure 7:
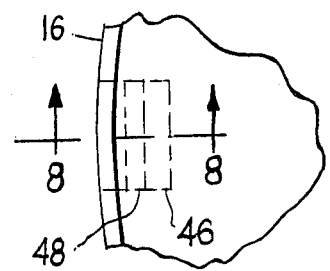
FIG. 7, is an enlarged top plan fragmentary view showing the connection of the top portion of the bird feeder to the squirrel baffle.
Figure 10:
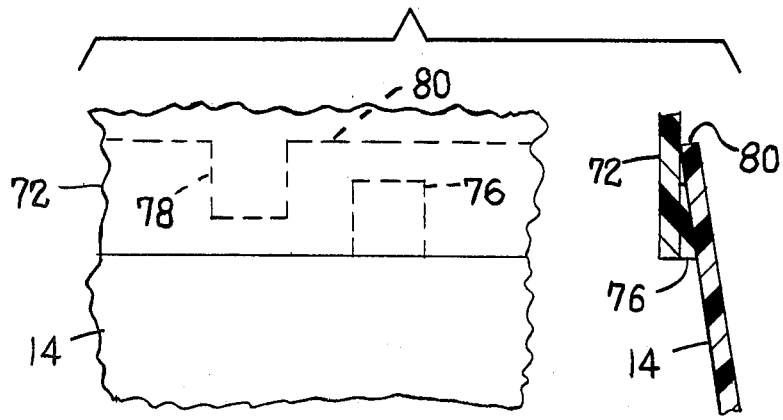
FIG. 10, is a view of the modified bird feeder taken similarly to FIG. 8, and showing the locked position of the lower baffle on the spacer.
Figure 11:
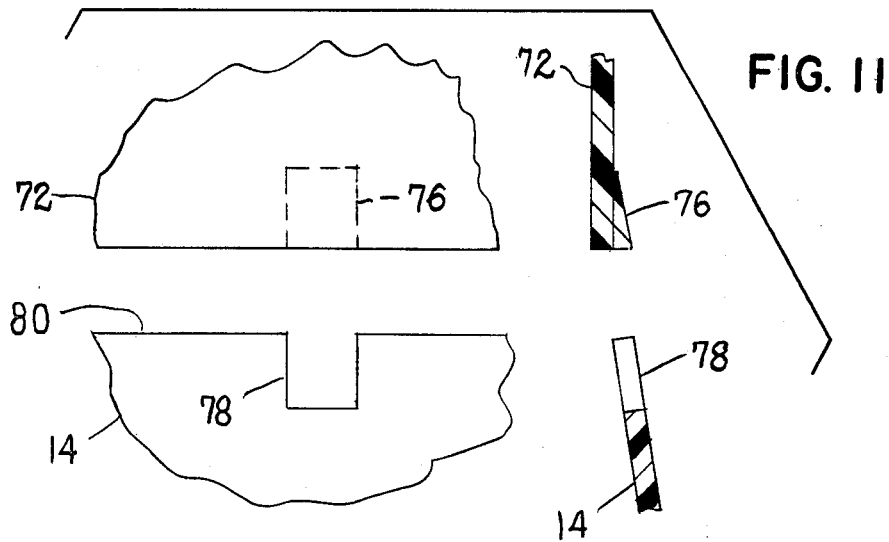
FIG. 11, is a view similar to FIG. 10, showing the unlocked position.

The support of the baffle 14 is best shown in FIGS. 3, 4, 5, 6, 7 and 8. The support connection for connecting the squirrel baffle to the bottom of the feeder tray is comprised of a downwardly depending and outwardly extending securing flange 46. This flange receives an inwardly extending key member 48 at the top of the baffle 14. The relationship is best shown in FIGS. 7 and 8 where it will be seen the baffle may be rotated with respect to the feeder tray to be locked and unlocked. The register of the key in the securing flange 46 effectively serves to provide the desired locking and unlocking action.

The housing 12 is of the same construction as the squirrel baffle 14. This it will be noted that the baffle 14 likewise has downwardly extending tabs and can be used interchangeably with the feeder housing 12. This greatly simplifies the manufacture of the feeder housing and baffle for the dual function as the feeder housing and the baffle. Both production and use are thereby merged.

It will be noted that the baffle 14 provides a spaced area 50 between the bottom of the baffle and the post 32. This makes it extremely difficult for a squirrel climbing the support to grasp the sides of the plastic baffle which is constructed of a hard material such as plexiglass, polystyrene or the like. Further, the upwardly and outwardly flaring nature of the baffle and overhang of the tray effectively prevents the squirrel from climbing onto the feeder tray.

The dual purpose feeder is shown in FIGS. 1 and 2 in free hanging relation without the squirrel baffle. In this use of the dual purpose feeder the connection rather than being to a central post support is by means of a chain 54 which is connected to support rod 56. The support rod is fitted within drilled openings 58 at opposite sides of the upper portion of the housing as appears in FIG. 2. A bight or detent portion 60 supports the chain 54 which is passed through the ferrule 20.

The feeder tray in the chain supported Figures has a solid base wall 22 or where an opening is used as in the post supported feeder a cover disc may be employed to over the hole in order to prevent loss of feed through the central tray opening used in the post supported embodiment. The tabs 26 of the housing are fused, bonded, cemented or otherwise connected to the base wall of the feeder tray.

In the chain supported version the post 36 may be used to support the chain without the union 34 by simply connecting the chain to a top portion of the post. It will be understood that the chain may be connected by a screw eye at the top of the post or the chain may be passed through the hollow post at the bottom and anchored by a cotter pin or the like.

A modified form of the bird feeder of this invention is shown in FIGS. 9-12 and is generally indicated by the reference numeral 70. Essentially this feeder is the same as the feeder 10 with regard to upper bird feeder housing, roof and the tray and the same reference numerals will be used for these components.

The modification consists essentially of providing a lower spacer portion 72 as a downward extension of the rim 23 of the feeder tray to which the lower baffle 14 is removably connected by a modified wedging locking means. By means of the spacer portion 72 the effective depth of the lower baffle is substantially increased to effectively discourage even the largest and most athletic of post climbing squirrels from reaching the feeder tray.

The structure of the spacer portion 72 comprises simply a lower extension of the rim 23 of the feeder tray as a hollow cylinder or tubular member which has an internal diameter at lower edge 74 just slightly larger than the external diameter of the top portion of the frusto-conical baffle 14.

Figure 12:
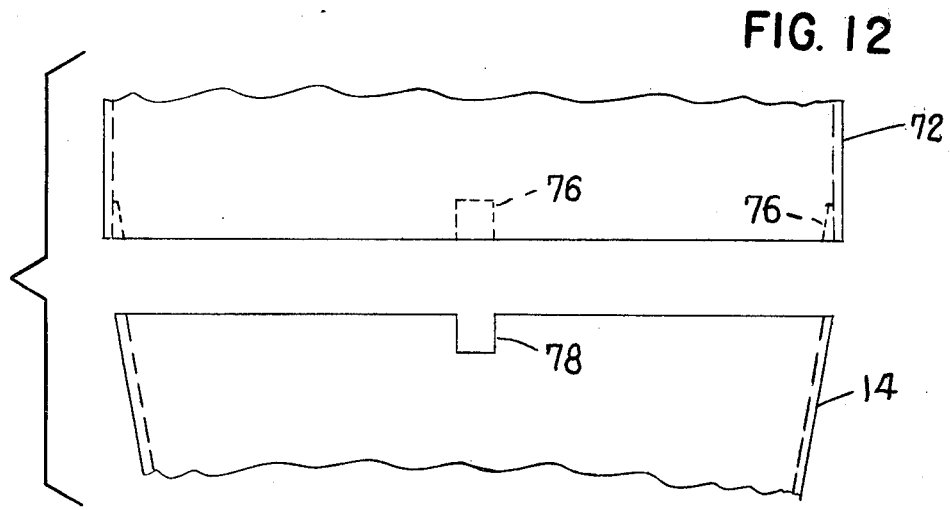
FIG. 12, is a fragmentary exploded view in elevation showing the lower portion of the spacer and the bottom baffle spacer from one another prior to being locked together.

Connected to the inner wall of the spacer portion 72 around the periphery thereof are a plurality of wedge shaped locked elements 76 which are provided to support or lock the baffle 14 to the spacer portion. Cut outs 78 are provided at the top edge 80 of the lower baffle in registry with the wedge element in order that as shown in FIG. 12 the baffle and spacer portion may be moved from an unlocked positon and then after being placed together relatively rotated to the locked position shown in FIGS. 10 and 13 where the wedge elements bear against and support the top edge 80 of the baffle 14.

USE

The dual purpose bird feeder of this invention in either the post supported version with the squirrel baffle or the chain supported version lends itself to very simple installation and effective use. In the post supported embodiment shown in FIGS. 3 and 4 the connection to the post through the union 34 is very simply effected.

In installation the feeder housing 12 is simply supported upon the feeder tray 16 by gravity and, as desired, by bonding or sealing of the tabs to the feeder tray. The baffle 14 is then secured to the bottom of the feeder tray by proper registry of the key 48 of the baffle within the locking flange 46 at the bottom of the feeder tray. The support extension 36 is then simply inserted within the union at the top of the tray which is supported upon the bearing 42 and which permits relative rotation. After the roof 18 is placed upon the feeder housing 12 the cap-nut 38 is connected to the threaded end of the support extension 36. The feeder is then ready for use.

In use the housing 12 is filled with feed by removing the cap-nut 38 and simply lifting the roof 28 by grasping the ferrule handle 20 and filling the top of the housing with feed. The feed will then flow outwardly through the openings 30 to the sides of the feeder tray.

After the feeder housing has been filled, the feeder trays are ready for use for songbirds and the like. Because of the relationship of the overhang of the roof with the shallow positioning of the feeder tray under the roof predators such as squirrels, pigeons and other undesireable large birds are effectively prevented from access to the feeder tray. Songbirds and smaller birds can however perch upon the side walls of the feeder tray and feed.

In the free hanging embodiment of FIGS. 1 and 2 the baffle 14 is not employed and rather than being employed by support upon a post the chain 54 is employed. The chain is simply connected to the support rod 56 which is inserted within the opposite side walls of the upper portion of the housing. The chain may then be connected to a limb or other stationary support as desired. When the feeder housing is desired to be filled, the roof 18 is simply lifted up the chain and the desired amount of feed is added.

In the free hanging position squirrels which may be able to climb down the chain and upon the roof will tend to tip themselves off the wide overhanging roof 18 to be pitched upon the ground or the like. The hard plastic surface of construction throughout the bird feeder further makes it difficult for the squirrel to obtain a grasp upon any portion of the structure to obtain access to the feeder tray 16.

The modified bird feeder 70 shown in FIGS. 9 through 12 is used in the same manner as the bird feeder 10. The feeder in the free hanging position without the lower baffle 14 operates in the same manner with the spacer portion 72 serving as an extension when the lower baffle is desired to be connected and used on the post mounted embodiment.

When the feeder 70 is used on a post support the lower baffle is simply connected to the spacer portion by placing the cut outs 78 at the upper edge 80 of the lower baffle in registry with the wedge shaped elements 76 at the bottom of the spacer portion. The lower baffle 14 is then turned to move the cut outs and the wedge shaped lock elements out of registry in order that the top wedge of the baffle may rest and be supported on the wedge shaped elements. Removal of the lower baffle 14 when desired is accomplished in a reverse manner.

The feeder 70 with the spacer portion 70 provides an effective extension of the lower baffle 14 below the feeder tray. The substantial increase in depth makes it possible to provide an extremely effective barrier to access to the feeder tray to even the most troublesome of squirrels.

Various changes and modifications may be made within this invention as will be readily apparent to those skilled in the art. Such changes and modifications are within the scope and teaching of this invention as defined by the claims appended hereto.

What is claimed is:

1. A bird feeder comprising a feeder housing supported upon a base tray having a peripheral portion extending beyond a bottom portion of said housing means for connecting said housing to a vertical support post and a squirrel barrier baffle member connected to an outermost peripheral portion of said tray and extending downwardly in spaced relation to said post, said baffle member extending downwardly a sufficient distance and being spaced from said post a sufficient distance to prevent a post climbing squirrel from reaching said tray, said baffle member being comprised of a downwardly tapering hollow inverted frusto-conical member, said frusto-conical member extending from a reduced diameter bottom edge spaced from said post to an enlarged diameter upper edge underlying the outer periphery of said tray to provide a sufficient outward and upward slope to prevent a squirrel from climbing thereon, said feeder housing comprising a hollow inverted frusto-conical member interchangeable with the baffle member.

2. The bird feeder of claim 1, in which said tray is comprised of a flat base and a cylindrical rim having a shallow first portion extending above said base and a second deep hollow spacer portion extending substantially below said base.

3. The bird feeder of claim 1, in which said baffle member is releasably connected to said tray by securing means, and said housing is provided with anchor means supporting a chain passing through said top opening in the roof for support of said housing in suspended relation from a vertical support upon release of said baffle member and said vertical support.

4. The bird feeder of claim 3, in which an upwardly extending ferrule is connected to the top of said roof, said ferrule receiving said support post extension in self guiding relation and serving as a handle for manually lifting said roof for loading of said housing with feed.

5. A bird feeder comprising a feeder housing supported upon a base tray having a peripheral portion extending beyond a bottom portion of said housing, means for connecting said housing to a vertical support post and a squirrel barrier baffle member connected to an outermost peripheral portion of said tray and extending downwardly in spaced relation to said post, said baffle member extending downwardly a sufficient distance and being spaced from said post a sufficient distance to prevent a post climbing squirrel from reaching said tray, said baffle member being comprised of a downwardly tapering hollow inverted frusto-conical member, the baffle member being connected to said tray by securing means, said securing means comprising a plurality of flange elements connected to the bottom of said base tray receiving key elements connected to a top portion of said baffle member.

6. A bird feeder comprising a feeder housing supported upon a base tray having a peripheral portion extending beyond a bottom portion of said housing, means for connecting said housing to a vertical support post and a squirrel barrier baffle member connected to an outermost peripheral portion of said tray and extending downwardly in spaced relation to said post, said baffle member extending downwardly a sufficient distance and being spaced from said post a sufficient distance to to prevent a post climbing squirrel from reaching said tray, said baffle member being comprised of a downwardly tapering hollow inverted frusto-conical member, said feeder housing supporting a conical roof having a top opening receiving an extension of said support post, securing means provided on said post to bear against said roof member and hold it on top of said housing, said tray having a radius not exceeding about 55% of the radius of said roof and said tray being positioned below said roof at a depth not exceeding about one-half of the radius of the roof, said tray having an outer periphery positioned substantially below an upper end of the feeder housing, said feeder housing comprising a hollow inverted frusto-conical member having a radius at said upper end not exceeding about 55% of the radius of the roof, said roof having a radius of 10 inches and the tray having a radius of 5½ inches and the tray being positioned below the roof at a depth of 4½ inches.

7. A bird feeder comprising a feeder housing supported upon a base tray having a peripheral portion extending beyond a bottom portion of said housing, means for connecting said housing to a vertical post and a squirrel barrier baffle member connected to an outermost peripheral portion of said tray and extending downwardly in spaced relation to said post, said baffle member extending downwardly a sufficient distance and being spaced from said post a sufficient distance to prevent a post climbing squirrel from reaching said tray, said baffle member being comprised of a downwardly tapering hollow inverted frusto-conical member, said feeder housing supporting a conical roof having a top opening receiving an extension of said support post, securing means provided on said post to bear against said roof member and hold it on top of said housing, said support post and extension being connected by a union means and a rotatable bearing supported upon said union, said bearing rotatably supporting said housing with respect to said support post.

8. A bird feeder comprising a feeder housing supported upon a base tray having a peripheral portion extending beyond a bottom portion of said housing and a conical roof supported upon said housing, said tray having a radius not exceeding about 55% the radius of said roof and said tray being positioned below said roof at a depth of not exceeding about one-half the radius of the roof, said feeder housing comprising a hollow inverted frusto-conical member having an upper end having a radius not exceeding about 55% the radius of the roof, said tray having an outer periphery positioned substantially directly below said upper end of the feeder housing, said roof having a radius of 10 inches and the tray having a radius of 5½ and the tray being positioned below the roof at a depth of 4½ inches.

9. A bird feeder comprising a feeder housing supported upon a base tray having a peripheral portion extending beyond a bottom portion of said housing, means for connecting said housing to a vertical support post and a squirrel barrier baffle member connected to an outermost peripheral portion of said tray and extending downwardly in spaced relation to said post, said baffle member extending downwardly a sufficient distance and being spaced from said post a sufficient distance to prevent a post climbing squirrel from reaching said tray, said baffle member being comprised of a downwardly tapering hollow inverted frusto-conical member, said tray being comprised of a flat base and a cylindrical rim having a shallow first portion extending above said base and a second deep hollow spacer portion extending substantially below said base, said spacer portion being connected at a lower portion to said baffle member.

10. The bird feeder of claim 9, in which the lower baffle member is connected to the cylindrical spacer portion by securing means, said securing means comprising wedge shaped locking elements connected to an inner wall of the spacer portion adapted to bear in wedging relation against the exterior portion of the lower baffle member at the top thereof.

11. The bird feeder of claim 11, in which the top wall portion of the lower baffle member is provided with cut out slots in registry with said wedge shaped locking elements to provide an unlocked position when said baffle member and spacer portion are rotated relative to one another.

* * * * *